United States Patent [19]

Huemer et al.

[11] 4,098,771

[45] Jul. 4, 1978

[54] PROCESS FOR THE PREPARATION OF POLYMERS OF VINYLENE CARBONATE

[75] Inventors: Heinrich Huemer, Marburg, Lahn; Karlheinz Burg, Naurod, Taunus, both of Germany

[73] Assignee: Hoechst Aktiengesellschaft, Frankfurt am Main, Germany

[21] Appl. No.: 750,583

[22] Filed: Dec. 15, 1976

[30] Foreign Application Priority Data

Dec. 17, 1975 [DE] Fed. Rep. of Germany ....... 2556759

[51] Int. Cl.$^2$ ..................... C08F 34/02; C08F 134/02
[52] U.S. Cl. ................................. 526/209; 526/210; 526/216; 526/269
[58] Field of Search ................................. 260/77.5 UA

[56] References Cited

U.S. PATENT DOCUMENTS

| | | | |
|---|---|---|---|
| 2,930,779 | 3/1960 | Drechsel | 260/77.5 UA |
| 2,934,514 | 4/1960 | Salyer et al. | 260/77.5 UA |
| 2,945,836 | 7/1960 | Salyer et al. | 260/77.5 UA |
| 2,993,030 | 7/1961 | Ham et al. | 260/77.5 UA |
| 3,021,340 | 2/1962 | Anderson | 260/77.5 UA |
| 3,037,965 | 6/1962 | Haas | 260/77.5 UA |
| 3,431,278 | 3/1969 | Forgione | 260/77.5 UA |

*Primary Examiner*—Herbert J. Lilling
*Attorney, Agent, or Firm*—Curtis, Morris & Safford

[57] ABSTRACT

Vinylene carbonate may be polymerized in bulk, in solution or in dispersion by means of free radical forming initiators. Suitable comonomers are vinyl compounds. The polymerization is carried out generally at a temperature of 40 to 170° C. The dispersing agents used in the dispersion polymerization are organic compounds which are liquid under normal conditions and which do not dissolve vinylene carbonate. Homo- and copolymers of vinylene carbonate may be used as starting material for the preparation of homo- and copolymers of vinylene glycol.

3 Claims, No Drawings

PROCESS FOR THE PREPARATION OF POLYMERS OF VINYLENE CARBONATE

Vinylene carbonate is an unsaturated, cyclic derivative of ethylene having the formula (I)

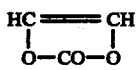  (I)

The preparation of poly(vinylene carbonate) having a high molecular weight by polymerization of the monomer in bulk or in solution initiated by free radicals is already known (cf. J. Polymer Sci. 58 (1962), pages 533 ff). The copolymerization of vinylene carbonate with different vinyl compounds is also known (cf. US Pat. Nos. 2,722,525; 2,847,398; 2,847,401; 2,847,402; 2,934,514; 2,945,836 and 2,957,847). Polymers of vinylene carbonate are used as plastic materials, as binders and as impregnating agents (cf. US Pat. Nos. 2,794,013 and 2,930,779).

The known polymerization processes have the disadvantage either that they are difficult to control owing to the exothermic polymerization reaction (polymerization in bulk) or that they are complicated and expensive owing to the presence of solvents and to losses of monomers (polymerization in solution).

The present invention relates to a process for the preparation of polymers of vinylene carbonate by polymerization of vinylene carbonate with 0 to 25 mole %, calculated on vinylene carbonate, of a vinyl compound copolymerizable with vinylene carbonate, in the presence of a free radical forming initiator, at a temperature of 40 to 170° C, with comprises carrying out the polymerization in the presence of a dispersing agent.

The process according to the invention permits homopolymers and copolymers of vinylene carbonate to be synthesized in simple manner and on any desired scale. It has the advantage that the monomer which has not been converted can be reused without purification after having been separated from the reaction mixture and that the polymer-containing reaction mixture can be worked up in very simplified manner.

Suitable comonomers for the preparation of copolymers of vinylene carbonate according to the invention are all compounds which are copolymerizable with vinylene carbonate and which have at least one vinyl group. Especially preferred are compounds having one or two olefinic bonds, i.e. compounds having the formula II or III

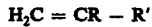  (II)

  (III)

in which A is an arylene radical having from 6 to 10 carbon atoms, a linear alkylene radical having from 2 to 6 carbon atoms or a linear alkylene dioxy radical, having from 4 to 8 carbon atoms, the carbon chain of which may be interrupted at intervals of 2 carbon atoms by one or several oxygen atoms, R is a hydrogen atom or a methyl radical and R' is a phenyl radical, a lower alkoxy radical having preferably 1, 2, 3 or 4 carbon atoms, a glycidoxy radical, a carboxy group, an alkylcarboxy group having from 2 to 10, preferably 2, 3, 4 or 5 carbon atoms, a glycidylcarboxy group, an acyloxy group having 2, 3, 4 or 5 carbon atoms, a cyano group or a 2-oxo-1-azacycloalkyl radical having 3, 4, 5 or 6 carbon atoms.

Suitable comonomers are for example, styrene, α-methylstyrene, alkyl vinyl ethers having from 3 to 6 carbon atoms, for example propyl vinyl ether, isopropyl vinyl ether, butyl vinyl ether and isobutyl vinyl ether, glycidyl vinyl ether, (meth)acrylic acid, (meth)acrylic acid methyl ester, ethyl ester, propyl ester, isopropyl ester, butyl ester, isobutyl ester, n-hexyl ester, 2-ethyl hexyl ester, n-octyl ester and glycidyl ester, vinyl acetate, vinyl propionate, vinyl butyrate, acrylonitrile, vinylpyrrolidone, 1,4-divinylbenzene, 2,7-divinyl naphthalene, hexadiene-(1,5), heptadiene-(1,6), octadiene-(1,7), butanol-(1,4) divinyl ether, pentanol-(1,5)-divinyl ether, hexanol-(1,6)-divinyl ether, diethylene glycol ether, triethylene glycol divinyl ether and tetraethylene glycol divinyl ether.

The total quantity of the comonomers, of which one or several may be used, may amount up to 25 mole % (calculated on vinylene carbonate). An amount of 1 to 15 mole % is used advantageously, the amount of 2 to 10 mole % being most preferred.

Suitable free radical forming initiators are organic peroxides or aliphatic azo compounds, which are used in an amount of 0.01 to 3, preferably of 0.1 to 2, weight % (calculated on the total quantity of monomers). There may be mentioned, by way of example, di-tertiary butylperoxide, dibenzoylperoxide, cumenehydroperoxide, cyclohexanone peroxide as well as α,α'-azoisobutyric acid nitrile and azodicarbonamide.

The process according to the invention is carried out at a temperature of 40° C to 170° C, preferably of 65° C to 125° C.

The essential feature of the present invention is that the polymerization is performed as dispersion polymerization, i.e. in the presence of a dispersing agent. Suitable dispersing agents are organic compounds which are liquid under normal conditions of pressure and temperature, which have a boiling point higher than 60° C, preferably of 85° to 300° C and which yield two phase systems with vinylene carbonate. Especially appropriate are hydrocarbons having from 6 to 16, preferably 12 to 16 carbon atoms, especially paraffins. A mixture of different compounds may also be used as dispersing agent.

Suitable hydrocarbons or mixtures of hydrocarbons are nhexane, n-heptane, n-octane, cyclohexane, isooctane and benzine fractions having a boiling range of 90° to 170° C, and low viscosity paraffin oil (cf. Deutsches Arzneibuch, 7th edition; DAB 7).

The monomers to be polymerized are contained in the dispersing agent in an amount of from 5 to 40, preferably 20 to 30 weight %.

It is advisable to carry out the process according to the invention in the presence of a dispersion stabilizer, which is preferably a non ionogenic, surface-active organic compound. Suitable compounds for said purpose are especially esters or partial esters of long chain, saturated fatty acids with polyvalent alcohols and the products obtained by ethoxylation of said esters or partial esters as well as ethoxylated saturated fatty acids, ethoxylated saturated fat alcohols and ethoxylated saturated fatty acid amides. Addition products of ethylene oxide on fat alcohols, especially those obtained by addition of 5 to 30, preferably 10 to 20 molecules of ethylene oxide per molecule of a linear or branched saturated fat alcohol having from 8 to 22, preferably 12 to 20 carbon atoms, are used advantageously. Addition products of ethylene oxide on a mixture of fat alcohols may also be used. The dispersion stabilizers are used in an amount of 0.2 to 10, preferably 1 to 5 weight % (calculated on the total quantity of the monomers).

The process of the invention is advantageously carried out in a reaction vessel provided with a stirring device, in which the particle size of the dispersed phase may be adjusted to the desired value by varying the stirring conditions. Especially advantageous is the use of a vertical cylindric vessel having a flat bottom, which is provided with a coaxially arranged stirrer, the shaft of which extends nearly to the bottom of the vessel. The stirring rate may be adjusted to a number of revolutions per minute of 100 to 450. The reaction vessel is vacuum-tight and may be equipped with a reflux condenser, a dropping funnel, a gas introduction tube and a device for measuring the temperature. Heating and cooling of the vessel are generally effected by means of a liquid bath, for example an oil bath or a water bath.

The process according to the invention is preferably carried out with the exclusion of atmospheric oxygen. For this reason, the reaction vessel is flushed with an inert gas, preferably nitrogen, prior to the beginning of the reaction. After completion of the polymerization reaction the monomers which have not been converted are removed from the reaction vessel, for example by evaporation under reduced pressure, preferably under a pressure of 0.1 to 15 bars. Thereafter the dispersing agent is separated from the solid polymer, for example by decantation, filtration or siphonage. Finally the polymer is washed with an organic solvent of low boiling point, preferably a hydrocarbon or a lower alkanol, and dried, preferably at a temperature of from 50° to 100°, preferably of from 60° to 80° C, drying under reduced pressure is advisable.

The polymers of vinylene carbonate prepared according to the invention are valuable intermediates for the preparation of homo- or copolymers of vinylene glycol, from which enzyme resins, affinity resins and immune absorbents, for example, may be prepared.

The following examples illustrate the invention:

EXAMPLE 1

The reaction vessel used is a cylindrical glass vessel having a flat bottom, an inner diameter of 150 mm, a height of 600 mm and a thickness of the wall of 6.5 mm. The vessel is provided with a sealing ring, made of poly(tetrafluoroethylene) on which a steel cover with a vacuum-tight stirrer, a reflux condenser, a dropping funnel, a gas introduction tube and a thermosensor are mounted. The shaft of the stirrer is arranged coaxially with regard to the reaction vessel and extends nearly to the bottom of the reaction vessel; it is provided with 11 cross-wise arranged stirring elements each having a length of 140 mm. The reaction vessel is suspended in a water bath, which is connected with a thermostat.

4 kg of low-viscosity paraffin oil (according to DAB 7) (dispersing agent) and 75 g of a mixture of fat alcohols having of 12 to 20 carbon atoms which is on the average ethoxylated with 25 ethylene oxide units (dispersion stabilizer) are introduced into said reactor flushed with nitrogen. The mixture obtained is heated to a temperature of 90° C while stirring (number of revolutions per minute 150 to 250) and mixed with 2.8 kg of vinylene carbonate. A solution of 21 g of $\alpha, \alpha'$-azoisobutyric acid nitrile (AIBN) in 200 g of vinylene carbonate is added to the mixture. The exothermic polymerization reaction starts about 5 minutes after the initiator is added, whereby the temperature of the dispersion rises to about 105° C. After about 30 minutes the main reaction has ended and the temperature of the reaction mixture has dropped to about 85° C. The mixture is then maintained with stirring at a temperature of 95° C for 3 hours.

Vinylene carbonate which has not polymerized is distilled off while stirring under a pressure of about 13 bars, while maintaining the temperature of 95° C. The pressure is reduced to about 3 bars, when approching the end of the distillation. The suspension remaining after the residual monomers have been separated is cooled to room temperature and the stirrer is stopped. The paraffin oil is siphoned from the rapidly settling solid poly(vinylene carbonate) The remaining polymer is washed three times with stirring (number of revolutions per minute 150) and heating to a temperature of 80° C with petroleum ether and once with methanol at 50° C. It is then suctionfiltered, washed with a small quantity of methanol and dried under slightly reduced pressure at a temperature of 70° C. The yield is 2.3 kg of poly(vinylene carbonate), which corresponds to 76.5% of the theory.

EXAMPLE 2

The reactor used is that described in Example 1. It is flushed with nitrogen and fed with 4 kg of the dispersing agent and 75 g of the dispersing stabilizer of Example 1. The mixture obtained is heated to a temperature of 90° C while stirring (number of revolutions per minute 200) and mixed with 2.8 kg of vinylene carbonate. A solution of 21 g of AIBN in 300 g of vinylpyrrolidone (7.6 mole %) is added to the mixture. The exothermic polymerization reaction starts about 5 minutes after the initiator is added, whereupon the temperature mounts to about 105° C. After about 30 minutes the main reaction has ended and the temperature of the reaction mixture has dropped to about 85° C. The mixture is then maintained at a temperature of 95° C with continuous stirring for 3 hours.

The reaction mixture is worked up as described in Example 1. The yield is 2.35 kg of a copolymer of vinylene carbonate and vinylpyrrolidone, which corresponds to 75.8% of the theory.

EXAMPLE 3

Example is repeated while using 200 g of vinyl propionate (5.8 mole %) instead of vinylpyrrolidone. The reaction takes an analogous course to that of Example 2. The yield is 2.05 kg of a copolymer of vinylene carbonate and vinyl propionate, which corresponds to 68.4% of the theory.

EXAMPLE 4

Example 2 is repeated while using a mixture of 100 g of glycidylmethacrylate (1.95 mole %) and 200 g of vinylene carbonate instead of 300 g of vinylpyrrolidone. The reaction takes an analogous course to that of Example 2. The yield is 2.11 kg of a copolymer of vinylene carbonate and glycidylmethacrylate, which corresponds to 68% of the theory.

EXAMPLE 5

Example 2 is repeated while using a mixture of 100 g of diethylene glycol divinyl ether (1.78 mole %) and 200 g of vinylene carbonate instead of 300 g of vinylpyrrolidone. The reaction takes an analogous course. The yield is 1.97 kg of a copolymer of vinylene carbonate and diethylene glycol divinyl ether, which corresponds to 63.5% of the theory.

EXAMPLE 6

The reactor used is that of Example 1. It is flushed with nitrogen and fed with 4 kg of a benzine mixture having a boiling range of 130° to 170° C and with 75 g of the dispersing stabilizer of Example 1. The mixture obtained is heated while stirring (at a rate of 280 revolutions per minute) to a temperature of 90° C and mixed with 2.8 kg of vinylene carbonate. A solution of 25 g of benzoylperoxide in 200 g of vinylene carbonate is added to the mixture obtained. The reaction takes an analogous course to that of Example 1.

After an after-polymerization time of 3 hours at a temperature of 95° C the temperature of the mixture is increased to 150° C and the unpolymerized vinylene carbonate is distilled off azeotropically together with the benzine mixture. The remaining product is washed with a small quantity of methanol and dried under a slightly reduced pressure at a temperature of 70° C. The yield is 2.21 kg of poly(vinylene carbonate), which corresponds to 73.5 % of the theory.

What is claimed is:

1. In a process for the preparation of polymers of vinylene carbonate by polymerization of vinylene carbonate together with 0 to 25 mole %, calculated on vinylene carbonate, of a vinyl compound copolymerizable with vinylene carbonate, in the presence of a free radical forming initiator. at a temperature of 40° to 170° C, the improvement which comprises carrying out the polymerization in a dispersing agent which is an organic liquid in which the vinylene carbonate and the product polymer are essentially insoluble under the polymerization conditions.

2. In a process for the preparation of polymers of vinylene carbonate by polymerization of vinylene carbonate together with 0 to 25 mole %, calculated on the vinylene carbonate, of a vinyl compound copolymerizable therewith, in the presence of a free radical forming initiator at a temperature of 40° to 170° C., the improvement which comprises carrying out the polymerization in a dispersing agent that is a liquid aliphatic hydrocarbon or mixture of aliphatic hydrocarbons of 6 to 16 carbon atoms in which vinylene carbonate and the product polymer are both essentially insoluble under the conditions of the polymerization reaction, said polymerization being carried out in the presence of a dispersion stabilizer.

3. In a process for the preparation of polymers of vinylene carbonate by polymerization of vinylene carbonate together with 0 to 25 mole %, calculated on the vinylene carbonate, of a vinyl compound copolymerizable therewith, in the presence of a free radical forming initiator at a temperature of 40° to 170° C., the improvement which comprises carrying out the polymerization in a dispersing agent that is a hydrocarbon which forms a two-phase system with vinylene carbonate and the product polymer and is selected from the group consisting of n-hexane, n-heptane, n-octane, cyclohexane, isooctane and benzine fractions having a boiling range of 90° to 170° C., in the presence of a dispersion stabilizer selected from the group consisting of ethoxylated fatty acid esters and partial esters and ethoxylated fatty acids, alcohols and amides.

* * * * *